Patented Mar. 7, 1944

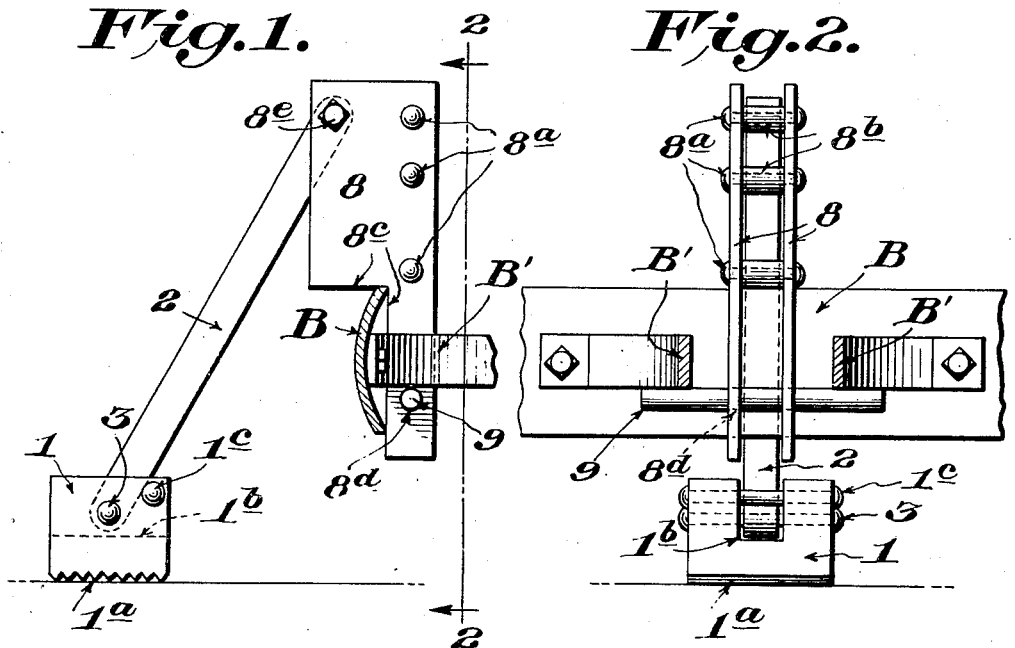
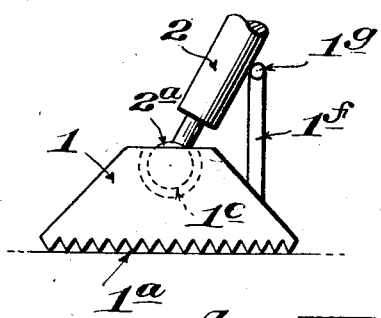
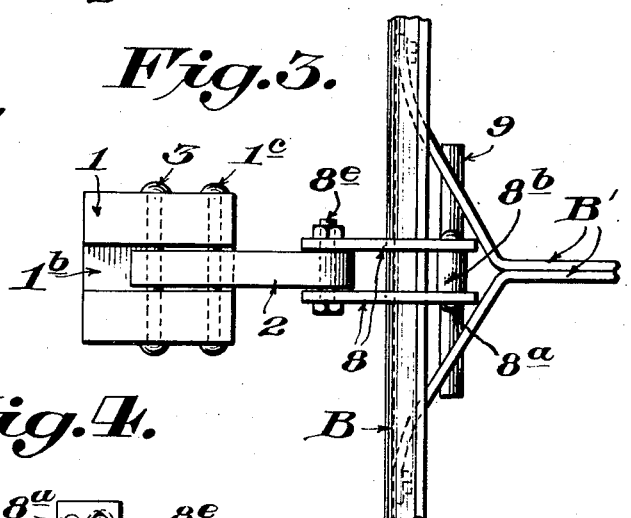
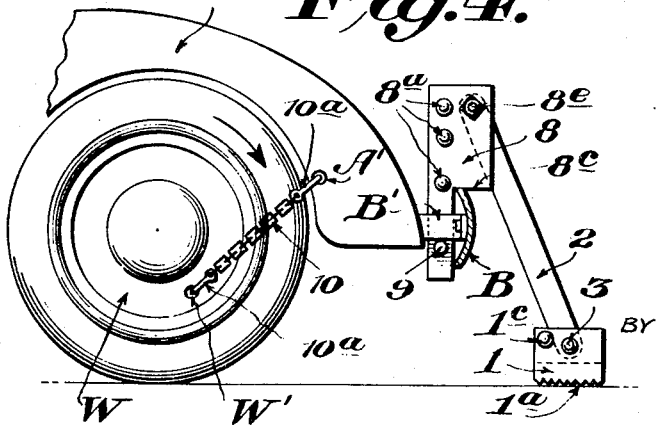

2,343,459

UNITED STATES PATENT OFFICE 2,343,459

AUTOMOBILE JACK

John E. Hines, Rochester, Minn.

Original application June 9, 1941, Serial No. 397,300, now Patent No. 2,270,004, dated January 13, 1942. Divided and this application November 17, 1941, Serial No. 419,498

6 Claims. (Cl. 254—94)

This invention is a novel improvement in automobile jacks, the present application being a division of my copending application for U. S. Letters Patent Serial No. 397,300, filed June 9, 1941 (now matured into U. S. Letters Patent No. 2,270,004 dated January 13, 1942).

The principal object of my invention is to provide a jack which when applied to the bumper or body of an automobile, and when the automobile is moved a short distance forwardly or backwardly, will raise the body and wheel of the automobile adjacent the jack above the ground surface, my invention thus utilizing the motor of the automobile itself to provide the necessary power for raising the body and wheel above the ground to permit changing of tires, the application of non-skid chains, or small repairs; my invention thus dispensing with the necessity for manually actuating a jack to raise the body or wheel.

Another object of the invention is to provide an automobile jack of the above type consisting of a base on which a swinging bar is mounted, either pivotally or by ball-and-socket joint, said bar being normally inclined to the road surface, and having removably secured thereto at its upper end a preformed novel bracket adapted to be secured in rigid position on the bumper without the use of bolts, screws or other extraneous devices and in such manner as to overlie the bumper bar and underlie the bumper brace rods, whereby when so applied, upon movement of the automobile, the bar of the jack will be shifted into vertical position, thereby raising the adjacent portion of the automobile body, and the adjacent wheel, above the ground surface.

A still further object of the invention is to provide simple and efficient means supplementing the use of the jack itself for preventing rotation of a drive wheel of an automobile of the conventional two-wheel drive, when said drive wheel itself is being raised, said means connecting the wheel and body in a manner which will prevent spinning of said wheel as it leaves the ground or road surface while being raised, thereby permitting the opposite drive wheel to move the vehicle to shift the swinging bar of the jack into substantially vertical position.

Other minor objects of the invention will be hereinafter set forth.

I will explain the invention with reference to the accompanying drawing, which illustrates several practical embodiments thereof, to enable others to adopt and use the same; and will summarize in the claims, the novel features of construction, and novel combinations of parts, for which protection is desired.

In said drawing:

Fig. 1 is a side elevation of one form of my novel jack showing the bracket secured to a conventional bumper of an automobile at the front or rear end thereof.

Fig. 2 is a vertical section on the line 2—2, Fig. 1.

Fig. 3 is a top plan view of the jack and adjacent portions of the automobile bumper, shown in Figs. 1 and 2.

Fig. 4 is an elevation showing my novel auxiliary means for preventing rotation of a wheel of the automobile which is to be raised, when said wheel constitutes one of the drive wheels of the automobile.

Fig. 5 is an elevation showing a ball-and-socket connection of the lifting bar to the base of the jack.

As shown in Figs. 1, 2 and 3, the jack preferably comprises a base 1 having a roughened lower face 1a, preferably serrated or scored, adapted to seat directly upon the road or ground surface. In the upper end of the base 1 is a slot 1b adapted to receive the lower end of a swingable lifting bar 2 pivoted on a bolt or pin 3 extending through the sides of the block and through slot 1b. Extending through the inner end of slot 1b is a pin or bolt 1c adapted to limit the swinging movement of bar 2 and to maintain said bar in normal position when the base is seated on the road or ground.

The upper end of bar 2 is perforated to receive a bolt 8e which pivotally secures the bar to a preformed bracket which is applied to the conventional front or rear bumper bar of the vehicle and which usually consists of a heavy bar B extending across the front or rear end of the vehicle projecting beyond the ends of the body thereof, said bumper bar B being secured to the vehicle body by means of bumper braces B' which, as shown in Fig. 3, are disposed in pairs which diverge outwardly usually on an arc so as to be tangent to the bumper bar B at their outer ends and to be contacting at their inner ends adjacent the body of the vehicle, the outwardly flaring pairs of brace rods B' forming with the bumper bar B a substantially triangular opening between the rear face of bumper bar B and the inner faces of braces B' which space is adapted to receive my novel bracket, as hereinafter described.

The bracket as shown consists of a pair of spaced parallel plates 8 secured in spaced relation by a row of rivets 8a extending adjacent one vertical edge passing through spacing washers 8b interposed between the plates 8. One lower corner of the bracket plates 8—8 is cut away as at 8c to form a shoulder adapted to seat directly upon the top of bumper bar B as indicated in Figs. 1 and 4, while the adjacent lower portion of the bracket is adapted to extend down behind bumper bar B to a point somewhat below the lower edge thereof as indicated in Figs. 1 and 4, the extended portion having aligned openings 8d therein to receive a lifting bar 9 of sufficient length to extend through the plates 8—8 and under the bumper braces B' at a point adjacent bumper bar B as indicated in Fig. 3, so that when the bracket is thus secured in the position, a lift or upward thrust on the bracket 8—8 will lift the bumper and the adjacent end or corner of the body, and also the adjacent wheel. The upper end of lifting bar 2 extends between the plates 8—8 above shoulder 8c, and is pivotally connected to the bracket 8—8 by a bolt, rivet, or pin 8e which may be removably or permanently secured in the bracket.

In applying the jack to the automobile, the bracket 8—8 is positioned with respect to bumper bar B as shown in Fig. 3, while bar 9 is removed, and then the bar 9 is inserted in the holes 8d in the lower end of the bracket so as to extend beneath the bumper braces B'. When the automobile is moved under its own power in the proper direction, as the case may be, the lifting bar 2 will be swung into substantially vertical position thereby raising the bumper and the adjacent end or corner and wheel of the automobile, the bumper bar engaging the lifting bar 2 limiting the swinging movement of bar 2 away from its normal position.

The jack may be used, alone, with any type of automobile in which all the wheels are power driven. However, when applying same to the bumper at the rear end of a conventional two-wheel rear axle drive type of automobile it is necessary to employ in addition to the jack, some means for preventing rotation of the rear wheel which is to be raised, in order to prevent spinning of said wheel which would cause the opposite drive wheel to lose traction. In order to prevent such spinning of the drive wheel which is being raised, a chain 10, Fig. 4, having hooks 10a at each end may be used, said hooks 10a engaging a hole W' in the wheel W which is being raised, and a hole A' in a fixed part of the body such as the adjacent fender A, said chain 10 being thus positioned just prior to driving the automobile rearwardly under its own power into jacked position, so that as the wheel W which is to be raised starts to leave the ground, chain 10 will effectively prevent spinning thereof, thereby permitting the opposite drive wheel which is then in contact with the ground or road to have the necessary traction to move the automobile into jacked position. Instead of chain 10, a rod having hooked ends might be used, but as the chain is flexible the same is more easily handled and stored.

Also in some cases it may be desirable to use a small ramp or wedge block under the traction wheel, i. e., the drive wheel opposite from that which is being jacked, in event the vehicle body is so rigid that when jacking one corner of the body both drive wheels would be raised from the ground. The ramp need be no longer than the arc of swing of the lifting bar 2. For four-wheel drive vehicles, or those driven by air power, the use of the chain 10 and the ramp or wedge block would not be required.

Ordinarily three wheels of the automobile would be in contact with the ground or road surface, and therefore a ball-and-socket joint may connect the lifting bar 2 to the base 1, as indicated in Fig. 5. In this modification the lifting bar 2 has a ball head 2a at its lower end engaging a parti-spherical seat 1e in base 1, said seat being open at its upper end while confining the ball head 2a therein to prevent separation of parts. The use of such modification dispenses with the necessity of having to substantially align the axis of slot 1b (Fig. 3) of the base in the path of movement of the automobile when applying the jack to the bumper of the automobile body. Base 1 (Fig. 5) is provided with an upright 1f at one end provided with a T-shaped head 1g adapted to support the bar 2 in a normally inclined position in a manner similar to the bolt or pin 1c of Figs. 1–4 inclusive.

My novel jack provides simple, novel and efficient means for raising the wheels, either driving or steering, of an automobile above the surface of the road or ground by raising the body thereof through the conventional bumpers thereof, utilizing the power of the automobile itself to shift the vehicle into jacked position. Use of my jack thus dispenses with the necessity of having to manually raise and lower the axle or body of the vehicle as is the usual practice with jacks now in use, which manual operation is laborious and which manually operated jacks are often difficult to properly position under the axle when a tire has been deflated.

I do not limit my invention to the exact form shown in the drawing, for obviously changes may be made therein within the scope of the claims.

I claim:

1. An automobile jack for raising a wheel of a vehicle body having bumper bars at the ends thereof, comprising a base; a lifting bar swingably mounted thereon; means on the base for normally supporting the bar in an inclined position; and a bracket pivotally secured to the lifting bar and adapted to be mounted on one said bumper, whereby when so mounted and the vehicle is bodily shifted towards the base, the lifting bar will be swung into substantially raised position, said bumper bar limiting the swinging movement of the lifting bar away from its normal position, said bumper bars being supported by brace bars; and said bracket having a shoulder adapted to seat upon the bumper bar, and having a depending portion extending below the bumper bar; and a removable lifting rod transfixing said depending portion and adapted to underlie a brace bar.

2. An automobile jack for raising a wheel of a vehicle body having bumper bars at the ends thereof, comprising a base; a lifting bar swingably mounted thereon; means on the base for normally supporting the bar in an inclined position; and a bracket pivotally secured to the lifting bar and adapted to be mounted on one said bumper, whereby when so mounted and the vehicle is bodily shifted towards the base, the lifting bar will be swung into substantially raised position, said bumper bar limiting the swinging movement of the lifting bar away from its normal position, said bumper bars being supported by pairs of brace bars; and said bracket comprising a pair of spaced parallel plates connected together, and having a portion at their front lower corners cut out to form a shoulder adapted to seat upon the bumper bar, the remaining portions of the lower ends of the plates extending behind and below the bumper bar; and a removable horizontal lifting rod transfixing the lower extending portions of the plates and adapted to underlie a pair of brace bars.

3. Automobile jacking means for raising a wheel of a vehicle body having bumper bars at the ends thereof, comprising a base; a lifting bar swingably mounted thereon; means on the base for normally supporting the bar in an inclined position; a bracket pivotally secured to the lifting bar and adapted to be mounted on one said bumper, whereby when so mounted and the vehicle is bodily shifted towards the base, the lifting bar will be swung into substantially raised position, said bumper bar limiting the swinging movement of the lifting bar away from its normal position; and means for preventing rotation of the vehicle wheel adjacent the bracket, said bumper bars being supported by spaced horizontal bumper brace bars; and said bracket having a shoulder adapted to seat upon the bumper bar, and having a depending portion extending below the bumper bar; and a removable horizontal lifting rod in said extending portion and adapted to underlie a brace bar.

4. Automobile jacking means for raising a wheel of a vehicle body having bumper bars at the ends thereof, comprising a base; a lifting bar swingably mounted thereon; means on the base for normally supporting the bar in an inclined position; a bracket pivotally secured to the lifting bar and adapted to be mounted on one said bumper whereby when so mounted and the vehicle is bodily shifted towards the base, the lifting bar will be swung into substantially raised position, said bumper bar limiting the swinging movement of the lifting bar away from its normal position; and means for preventing rotation of the vehicle wheel adjacent the bracket, said bumper bars being supported by spaced horizontal pairs of brace bars; and said bracket comprising a pair of spaced parallel plates connected together, and having a portion at their front lower corners cut out to form a shoulder adapted to seat upon the bumper bar, the remaining portions of the lower ends of the plates extending behind and below the bumper bar; and a removable horizontal lifting rod transfixing the lower extending portions of the plates and adapted to underlie a pair of brace bars.

5. A bracket for jacks for raising a wheel of automobile bodies having bumper bars at their ends supported by spaced horizontal bumper brace bars; comprising a member adapted to be pivotally connected with a lifting element and having a shoulder adapted to seat upon the bumper bar, and having a depending portion extending below the bumper bar; and a removable horizontal rod transfixing said extending portion and adapted to underlie a brace bar.

6. In a bracket as set forth in claim 5, said member comprising a pair of spaced parallel plates connected together, said plates having a portion of their front lower corners cut out to form said shoulder, the remaining portions of the lower ends of the plates comprising said depending portions adapted to extend behind and below the bumper bar between a pair of brace bars; and said rod being adapted to underlie said pair of brace bars.

JOHN E. HINES.